United States Patent [19]

Yamazaki

[11] Patent Number: 4,841,522
[45] Date of Patent: Jun. 20, 1989

[54] TIME DIVISION CHANNEL SWITCHING CIRCUIT

[75] Inventor: Katsuyuki Yamazaki, Tanashi, Japan

[73] Assignee: Kokusai Denshin Denwa Kabushiki Kaisha, Tokyo, Japan

[21] Appl. No.: 164,820

[22] Filed: Mar. 7, 1988

[30] Foreign Application Priority Data

Mar. 13, 1987 [JP] Japan .................. 62-56706

[51] Int. Cl.[4] .......................................... H04Q 11/04
[52] U.S. Cl. ......................................... 370/64; 370/58
[58] Field of Search ............... 370/64, 59, 66, 68, 370/58

[56] References Cited

U.S. PATENT DOCUMENTS

| 4,131,763 | 12/1978 | Herschtal | 370/66 |
| 4,355,384 | 10/1982 | Genter et al. | 370/64 |
| 4,748,615 | 5/1988 | Kruger et al. | 370/64 |

Primary Examiner—Douglas W. Olms
Attorney, Agent, or Firm—Emmanuel J. Lobato; Robert E. Burns

[57] ABSTRACT

A time division channel switching circuit is disclosed, in which time switches and selectors are provided, channel information is written into the time switches in parallel and redundantly and is read out therefrom independently, and desired channel information is selected by the selectors. As a result of the above operations, a desired sub channel on the incoming side is switched to a desired sub channel on the outgoing side in a non-blocking fashion.

3 Claims, 4 Drawing Sheets

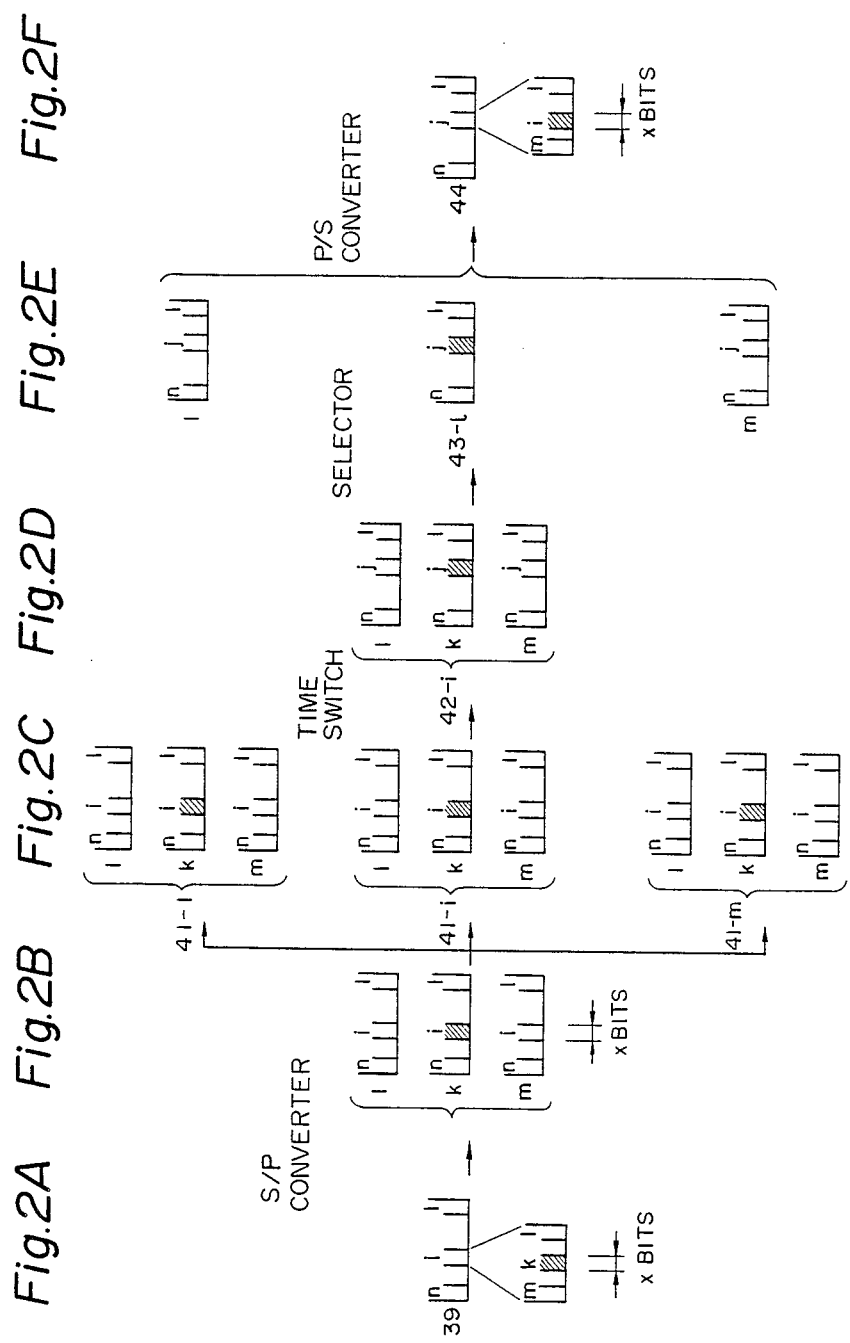

TIME DIVISION CHANNEL SWITCHING CIRCUIT

BACKGROUND OF THE INVENTION

The present invention relates to an arrangement of a time division channel switching circuit for switching sub-channel-multiplexed channel information.

A switching system or an integrated services digital network (ISDN) calls for a large scale channel switching circuit which permits efficient switching of sub-channel-multiplexed channel information.

The conventional switching system, however, requires high speed memory elements. Accordingly, a large capacity switch for sub channel switching cannot be obtained by the use of low speed memory elements.

SUMMARY OF THE INVENTION

It is therefore an object of the present invention to provide a time division channel switching circuit arrangement which permits the implementation of a large-capacity switch even if memory elements of limited operating speed are employed.

The present invention has its characterized feature in that time switches and selectors are provided, channel information is written into the time switches in parallel and redundantly and is read out therefrom independently, and desired channel information is selected by the selectors, whereby a desired sub channel on the incoming side is switched to a desired sub channel on the outgoing side in a non-blocking fashion.

BRIEF DESCRIPTION OF THE DRAWINGS

The present invention will be described in detail below in comparison with prior art with reference to the accompanying drawings, in which:

FIGS. 2A to 2F are diagrams explanatory of the operation of the embodiment shown in FIG. 1;

DETAILED DESCRIPTION

To make differences between prior art and the present invention clear, a description will be given first, with reference to FIG. 3, of the concept of switching sub-channel-multiplexed channel information (hereinafter referred to as "sub channel switching").

Figure 3A:
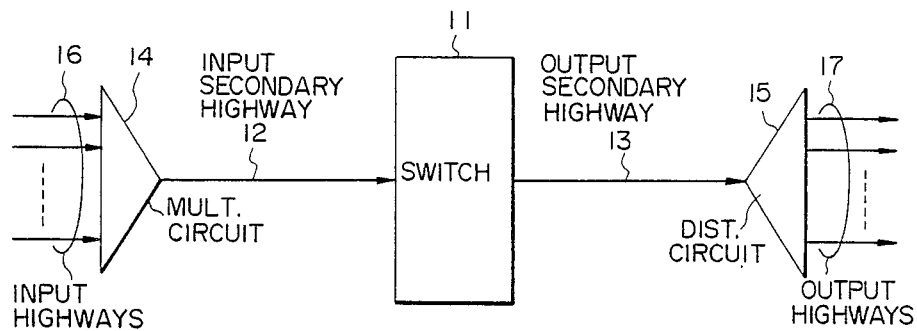
FIGS. 3A to 3B are diagrams explanatory of the principle of sub channel switching.
Figure 3B:
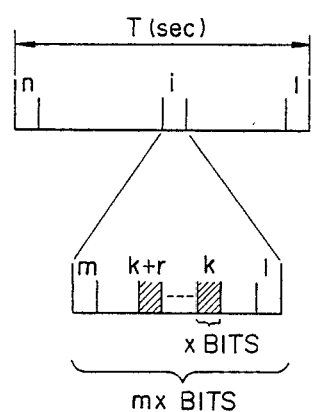
Figure 3C:
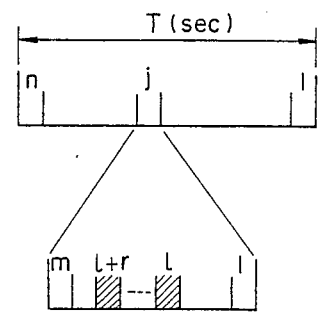

In FIG. 3A, reference numeral 11 indicates a switch for implementing the sub channel switching, 14 a multiplexing circuit for combining a plurality of input highways 16 into one input secondary highway 12, and 15 a distribution circuit for distributing one output secondary highway 13 to a plurality of output highways 17. The input secondary highway 12 and the output secondary highway 13 are highways over which a channel composed of m x-bit sub channels is transmitted in the form of n time division multiplexed channels within a time division perod of T sec (125 $\mu$s in ordinary PCM communication), as shown in FIGS. 3B and 3C.

In such an arrangement as depicted in FIG. 3A, the sub channel switching is a function by which, in a digital transmission service using, as a channel, r (where $m \geq r$) desired continuous or discontinuous sub channels, desired sub channels (r continuous sub channels k to k+r in FIG. 3B) of a desired channel (i in FIG. 3B) on the input secondary highway 12 is switched to desired sub channels (r continuous sub channels l to l+r in FIG. 3C) of a desired channel (j in FIG. 3C) on the output secondary highway 13.

In the sub channel switching in the ISDN, for example, when m=8 sub channels and x=1 bit, switching service is offered at bit rates of 8 K bits/s (r=1), 16 K bits/s (r=2), 32 K bits/s (r=4), etc., depending on the value r. When m=6 sub channels and x=8 bits, wide band switching service is offered at a desired bit rate of 64 K bits/s (r=1) to 38 K bits/s (r=6).

Figure 4B:
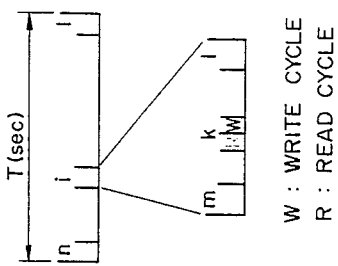
FIGS. 4A and 4B diagrams explanatory of a conventional time division channel switching circuit.
Figure 4A:
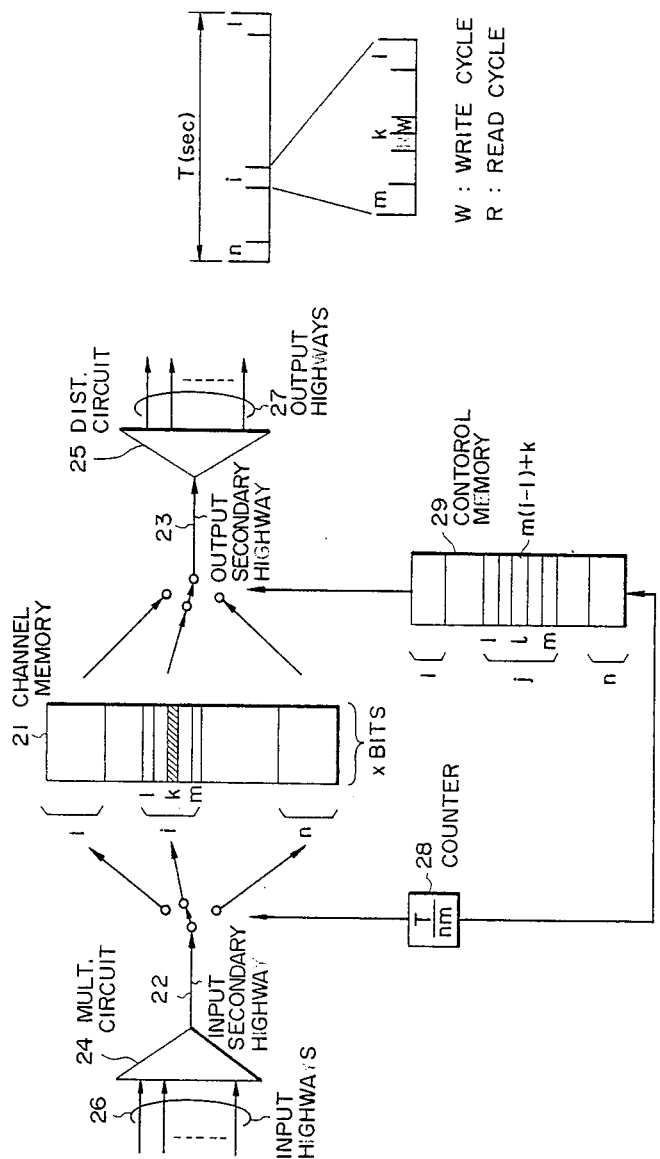

A conventional switching circuit for such sub channel switching is known such as shown in FIG. 4A. In FIG. 4A, reference numeral 21 designates a channel memory, which has a capacity of nm sub channels corresponding to one frame (T sec), 22 and 23 input and output secondary highways, 24 a multiplexing circuit, 25 a distribution circuit, 26 and 27 input and output highways, 28 a counter which counts from 1 to nm with a clock timing of T/nm within the frame period T, and 29 a control memory which has a capacity of nm words for storing addresses of the channel memory 21. The operation of this switching circuit will herein below be described with reference to FIG. 4A and FIG. 4B which shows the read/write cycle for the channel memory 21. The counter 28 is synchronized with the frame period of the input secondary highway 22. That is, while information of a k sub channel in an i channel is being transmitted over the input secondary highway 22, the contents of the counter 28 are of m(i−1)+k. By sequential writing of the information on the input secondary highway 22 into the channel memory 21 through use of the count value as the address therefor, the whole channel/sub channel information will have been written into the channel memory 21 at the end of the period T. On the other hand, the control memory 29 has prestored therein addresses for randomly reading out information from the channel memory 21. For instance, let it be assumed that a value of m(i−1)+k is stored in the control memory 29 at an address (m(j−1)+l corresponding to an l sub channel in a j channel on the output secondary highway 23. In this instance, when the counting value of the counter 28 has reached a value of (m(j−1)+l, the contents {(m(i−1)+k} at the address m(j−1)+l of the control memory 29 are read out using the above counting value as the address therefor, and the contents of the channel memory 21 are read out using the read-out contents m(i−1)+k as the address therefor, by which the information of the k sub channel in the i channel on the input secondary highway 22 can be switched to the l sub channel in the j channel on the output secondary highway 23.

The above-described circuit arrangement of the prior art has a defect of involving very high-speed memory elements for the channel memory 21 and the control memory 29. As will be evident from the above, the channel memory 21 is needed to operate in total 2 nm times within the frame period T, i.e. nm times for each of the write operation and the readout operation. The control memory 29 also has to be read out nm times. Accordingly, it is impossible, with this circuit arrangement, to increase the capacity of the switching circuit (the number of channels x the number of sub channels=n.m), due to the requirement that the operating speed i of each memory element be lower than T/2 nm (that is, i<T/2 nm).

An embodiment of the present invention will hereinafter be described in detail with reference to FIGS. 1 and 2.

Figure 1:
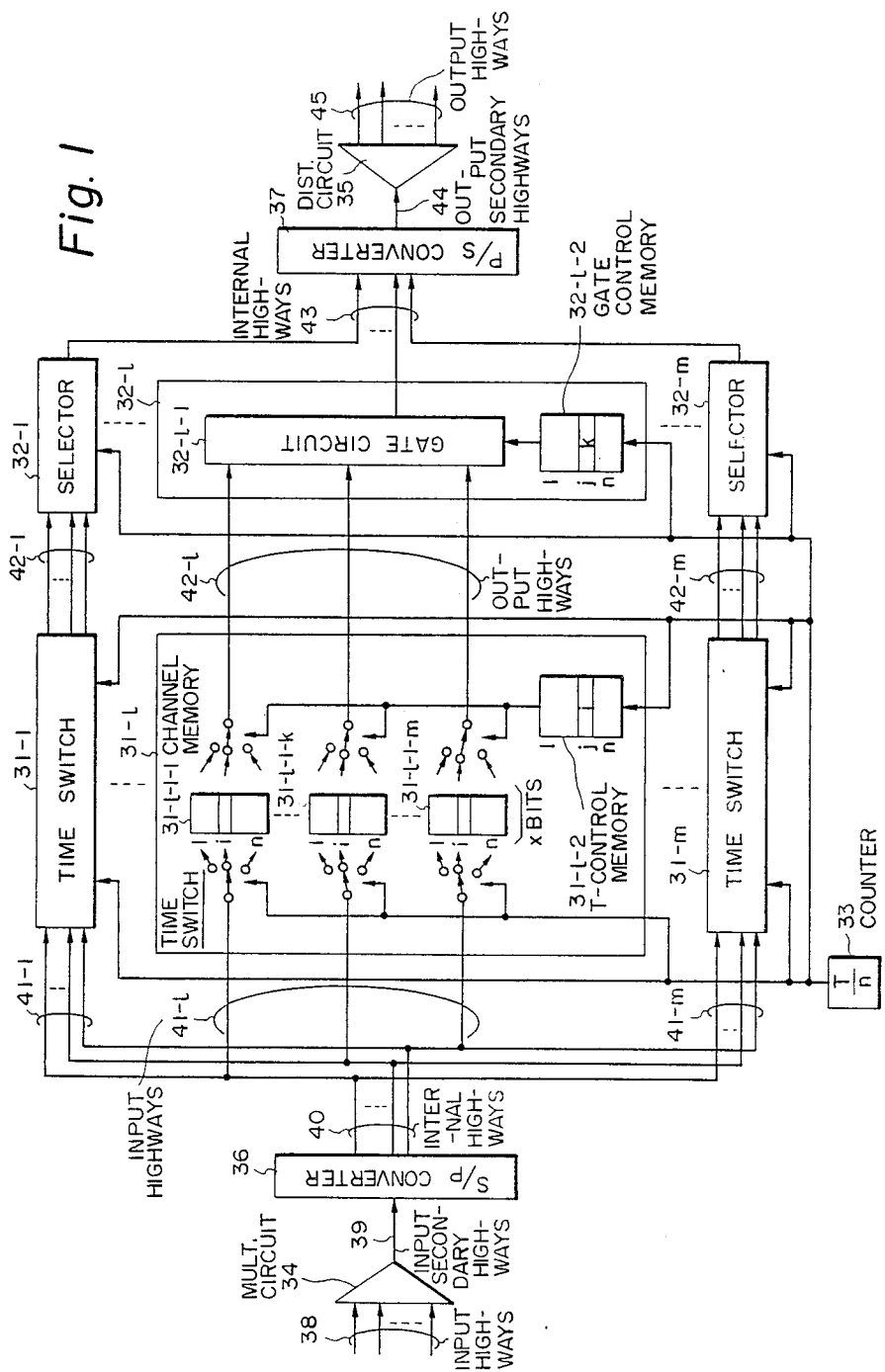
FIG. 1 is a diagram illustrating an embodiment of the time division switching circuit of the present invention.

FIG. 1 illustrates a time division channel switching circuit of an embodiment of the present invention. In FIG. 1, reference numerals 39 and 44 identify input secondary highways and output secondary highways, respectively; 34 a multiplexing circuit; 35 a distribution circuit; 38 and 45 input highways and output highways, respectively; and 36 and 37 a serial-to-parallel converter and a parallel-to-serial converter, by which the input and output secondary highways 39 and 44, each having m multiplexed sub channels, and m internal highways 40 and 43 are converted mutually. The m internal highways 40 become input highways 41-1 to 41-m to m time switches 31-1 to 31-m, and m output highways 42-1 to 42-m from the time switches 31-1 to 31-m are input to selectors 32-1 to 32-m, whose outputs constitute the m internal highways 43. The time switches 31-1 to 31-m each comprise channel memories 31-1--1-1 to 31-l-1-m and a T control memory 31-1-2, as exemplified in connection with the time switch 31-l. The selectors 32-1 to 32-m each comprise a gate circuit 32-l-1 and a gate control memory 32-l-2, as exemplified in connection with the select circuit 32-l. Reference numeral 33 indicates a counter, which supplies clock pulses to the time switches 31-1 to 31-m and the selectors 32-1 to 32-m.

Next, the operation of this time division channel switching circuit will be described with regard to the case of switching information of a k sub channel in an i channel on the input secondary highway 40 to an l sub channel in a j channel on the output secondary highway, as in the example described previously in repsect of FIGS. 3A to 3C. Incidentally, the following description will be given of the constitution and operation of the l-th time switch 31-l and the n-th selector 32-l shown in FIG. 1. To facilitate a better understanding of the description, reference is made to FIG. 2 which shows channels and sub channels of the highways 39, 40,, 41, 42, 43 and 44.

This time division channel switching circuit operates as follows:

(1) The serial form of the input secondary highway (FIG. 2A) is converted by the serial-to-parallel converter 36 into parallel form on the m internal highways 40 (FIG. 2B), thereafter being input into the m time switches 31-1 to 31-m redundantly (FIG. 2C).

(2) In the l-th time switch 31-l, as depicted in FIG. 1, the m channel memories 31-l-1-1 to 31-l-1-m, each having a capacity of n channels×x bits, are provided in correspondence to the m input highways 41-l. The counter 33 is counting from 1 up to n with the clock timing of T/n, and as the counting state proceeds, information of the input highways is sequentially stored into the channel memories. Consequently, information of the sub channel 1, information of the sub channel 2, ... and information of the sub channel k are stored into the channel memories 31-l-1-1, 31-l-1-2, ... and 31-l-1-k, respectively.

(3) Let it be assumed that the value i has been prestored in the T control memory 31-l-2 at the j address. When the count value of the counter 33 reaches the value j, the contents (i) at the j address of the T control memory 31-l-2 are read out and the contents at the i address of the channel memory are read out, whereby information of the i channel of the input highway 41-l is provided to the j channel on the output highway 42-l of the time switch 31-l (FIG. 2D).

(4) Next, this highway 42-l is input into the l-th selector 32-l, as shown in FIG. 1. Assuming that the value k has been prestored in the gate control memory 32-l-2 at the j address, the gate circuit 32-l-1 delivers the information of the k-th input highway onto the output highway 43 in synchronism with the clock for the j channel (FIG. 2E).

(5) The parallel-to-serial converter 37 re-converts the highways from the m selector into the highway 44 of serial form (FIG. 2F). In this way, the information of the k sub channel in the i channel on the input highway 40 is switched to the l sub channel in the j channel on the output secondary highway 44, by the l-th time switch 31-l and the l-th selectro 32-l.

(6) While the above description has been given of the switching of one sub channel, th above-described operation is equally applicable to any desired one of the m multiplexed sub channels. Further, since this operation can be performed in parallel for other sub channels in the channel j on the output side, switching of a plurality of desired continuous or discontinuous sub channels can be achieved.

The sub channel switching function itself of this time division switching circuit is identical with the function of the conventional switching circuit shown in FIG. 4. However, the arrangement of FIG. 4 requires the operating speeds of T/2 nm and T/nm for the channel memory and the control memory, respectively, whereas in the arrangement of FIG. 1 they are T/2m and T/n, respectively. Accordingly, the use of the arrangement of the present invention provides a switch of a capacity m times larger than that in the prior art if the memories used are of the same speed; namely, a large capacity switch for sub channel switching can be obtained. Morover, if the switch capacity is the same, the present invention permits the use of memory elements of lower operating speed than that of the prior art. This enables the switch to be miniaturized and to have low-cost, through use of MOS elements of high integration density and small calorific value.

What we claim is:

1. In a time division channel switching circuit, in which a desired sub channel accommodated in a desired channel on an inputhighway, where n (an integer more than one) channels, each having m (an integer more than one) sub channels, have been time-division-multiplexed, is switched to a sub channel of a desired channel on a time-division-multiplexed output highway, the improvement comprising:

a serial-to-parallel converter whereby the input highway is converted into a plurality m of internal highways equal in number to paralleled sub channels;

time switches of the same number m as that of sub channels, each time switch having channel memories of the same number as that of sub channels and each channel memory having a memory capacity separated into a plurality of blocks equal to the number n of channels;

selectors, each provided in correspondence to one of the time switches, for selecting a desired channel memory output of the corresponding time switch; and a parallel-to-serial converter for time division multiplexing the output of each selector into the output highway;

wherein the internal highways are supplied to all the time switches in parallel; the contents of the desired same address are read out of the respective channel memories in one of the time switches and a desired one of the channel memory outputs is selected by one of the selectors in correspondence to said one of the time switches.

2. In a time division channel switching circuit, in which a desired sub channel accommodated in a desired channel on an input highway, where n (an integer more than one) channels, each having m (an integer more than one) sub channels, have been time-division-multiplexed, is switched to a sub channel of a desired channel on a time-division-multiplexed output highway, the improvement comprising:

a serial-to-parallel converter whereby the input highway is converted into a plurality m of internal highways equal in number to paralleled sub channels;

time switches of the same number m as that of sub channels, each time switch having channel memories of the same number m as that of sub channels and each channel memory having a memory capacity separated into a plurality of blocks equal to the number n of channels;

selectors, each provided in correspondence to one of the time switches, for selecting a desired channel memory output of the corresponding time switch;

a parallel-to-serial converter for time division multiplexing the output of each selector into the output highway;

a counter for generating clock pulses for one n-th of the frame period T of said time-division multiplexing; and wherein the internal highways are supplied to all the time switches in parallel; the contents of the desired same address are read out of the respective channel memories in one of the time switches in synchronism with the clock pulses and a desired one of the channel memory outputs is selected in synchronism with the clock pulses by one of the selectors in correspondence to said one of the time switches.

3. A time division channel switching circuit according to claim 2, including a gate control memory to which said clock pulses are applied, and wherein each of the selectors comprises a gate circuit connected to said one of the time switches for receiving the desired channel memory output of the corresponding time switch and for providing the output of each selector under control of said gate control memory, to which said clock pulses are applied.

* * * * *